United States Patent [19]

Flair

[11] 4,001,943
[45] Jan. 11, 1977

[54] VARIABLE INVOLUTE DISC GAUGE

[75] Inventor: Henry J. Flair, Franklin Park, Ill.

[73] Assignee: Illinois Tool Works Inc., Chicago, Ill.

[22] Filed: Jan. 30, 1976

[21] Appl. No.: 653,914

[52] U.S. Cl. .......................... 33/174 R; 33/179.5 D
[51] Int. Cl.² .......................................... G01B 05/00
[58] Field of Search ............... 33/179.5 R, 179.5 D, 33/174 R, 165, 168 B

[56] References Cited

UNITED STATES PATENTS

| | | | |
|---|---|---|---|
| 2,249,611 | 7/1941 | Johnson | 33/168 B |
| 2,337,144 | 12/1943 | Young | 33/179.5 D |
| 2,802,277 | 8/1957 | Jaegar | 33/179.5 R |
| 3,237,442 | 3/1966 | DeVos | 33/179.5 R |

FOREIGN PATENTS OR APPLICATIONS 2,217 8/1908 United Kingdom ............. 33/168 B Primary Examiner—Richard E. Aegerter
Assistant Examiner—Richard R. Stearns
Attorney, Agent, or Firm—Robert W. Beart; Glenn W. Bowen

[57] ABSTRACT

An involute disc gauge which is capable of verifying that a variable involute gear checking apparatus is functioning properly is described. The gauge consists of a support block, which is mounted for rotation and an adjustable bar which is slideable in the support block to adjust the diameter of the circle described by the outer end of the bar. Removable discs of various diameters are provided at the end of the adjustable bar in accordance with the base diameter of the gear being checked to achieve highly accurate verifications of a multitude of gear sizes with a single gauge.

8 Claims, 3 Drawing Figures

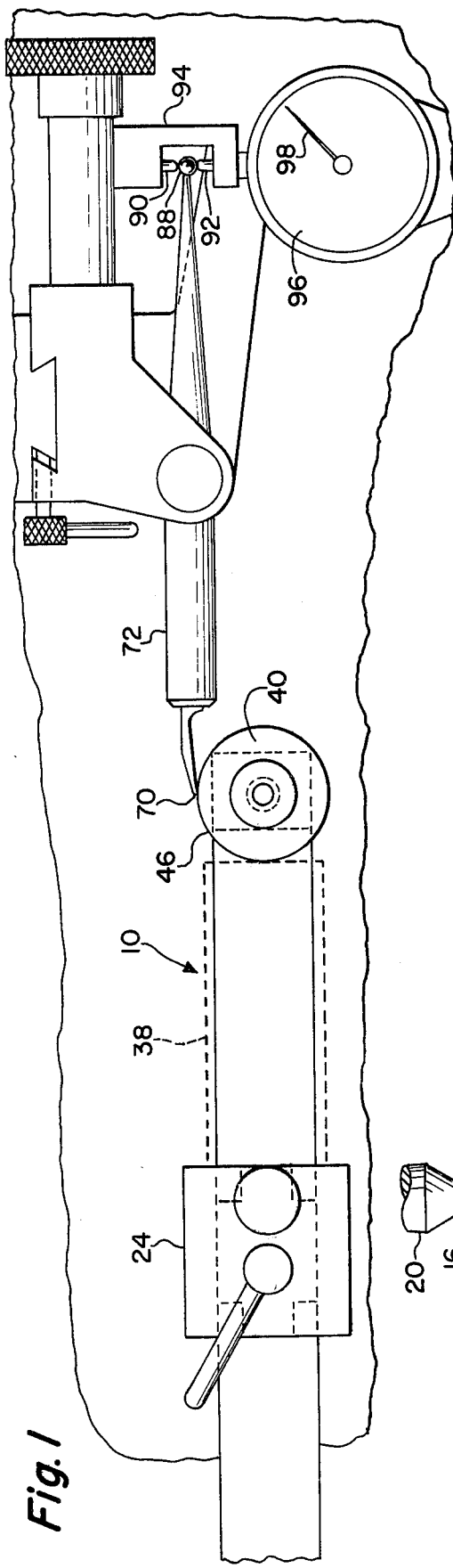
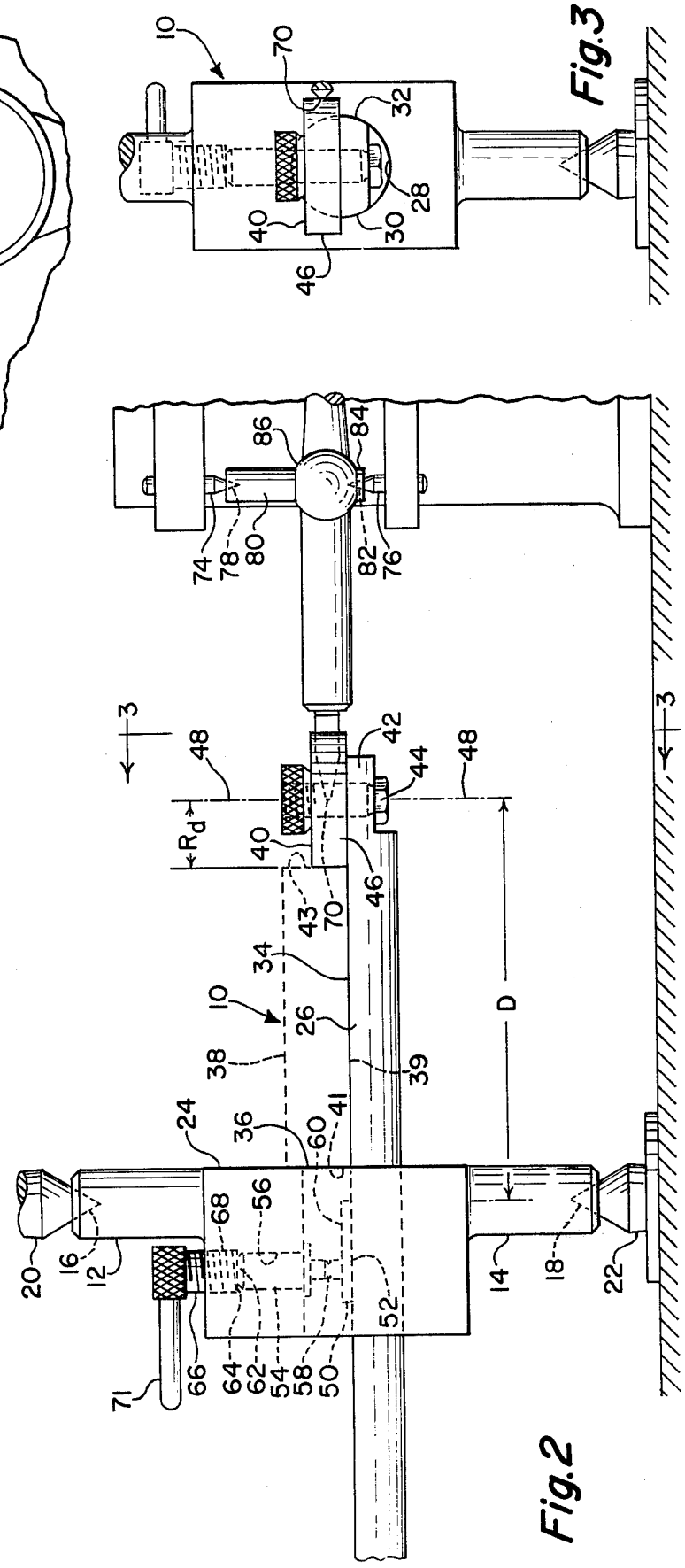

VARIABLE INVOLUTE DISC GAUGE

BACKGROUND OF THE INVENTION

Involute gear profile measuring instruments are on the market which are reliable and precise. One such type of instrument is the 3400 Series Profile Measuring Instrument that is sold by the assignee of the present invention, which may check the profile of involute gears up to 24 inches in diameter in 0.0001 inch increments. The principle of operation of this type of instrument is described in U.S. Pat. No. 2,787,060, which issued on Apr. 2, 1957 to the inventor of the present application, and which was assigned to the assignee of the present invention. It is capable of measuring gears up to 24 inches and larger in diameter. The gear checking instrument of the above mentioned prior patent utilized a master cam in order to measure the profile of a family of geometrically proportional gears without replacement of the master cam during measurement of the gears. The device of the present invention is useful with, but it is not limited to, this type of instrument, however.

While the gear checking instrument described in the aforementioned patent is highly accurate and effective, it is still necessary from time to time to verify the accuracy of the instrument to insure that it is functioning properly at the setting for the gear diameter that is being checked. To achieve this, a separate profile gauge could previously be supplied for each gear diameter that was to be checked on the instrument. This profile gauge was mounted for rotation between a pair of centers and a disc was secured to the gauge with its axis positioned parallel to the axis of rotation of the gauge. One or more external or internal gear teeth could be formed on the dis, if desired.

The major disadvantage of this type of verification device, however, was that in order to check gears up to 24 inches in diameter in 0.0001 inch increments 240,000 separate profile gauges would have to be provided.

The main object of the present invention is, therefore, to provide a single variable involute disc gauge which is capable of verifying the accuracy of a gear measuring instrument for use with a multitude of gears over a wide range of gear base diameters in a relatively inexpensive and uncomplicated manner.

DESCRIPTION OF THE DRAWINGS

The present invention is illustrated by reference to the drawings in which:

FIG. 1 is a top view of the variable involute disc gauge of the present invention which shows a portion of the gear measuring instrument in which it is mounted;

FIG. 2 is a side view of the variable involute disc gauge of FIG. 1; and

FIG. 3 is an end view of the variable involute disc gauge of FIG. 2.

TECHNICAL DESCRIPTION OF THE INVENTION

The variable involute disc gauge 10 of the present invention is shown in the drawings in conjunction with a portion of the gear measuring instrument of U.S. Pat. No. 2,787,060, which is one type of instrument that it may be used with to verify that the instrument is functioning properly over a wide range of gear base diameters. The gauge 10 is formed with a pair of cylindrical shafts 12, 14 which have indentations 16, 18 for receiving the centers 20, 22 respectively, of the gear measuring instrument. The centers 20, 22 are the same centers that rotate the gear which is to be checked.

The shafts 12, 14 are separated by a block section 24 which has an arm 26 that projects through a cylindrical passageway 28 formed through section 24. The sides 30, 32 of the arm 26 conform to the shape of the passageway 28 along a segment thereof. Thus the extent that the arm 26 may be forced downwardly is limited by the shape of the passageway 28 and the cross-sectional shape of the arm 26. This allows the arm 26 to be locked into place when the arm is extended a predetermined length to the right, as viewed in FIG. 2.

The upper surface 34 of the arm 26 and the surface 36 of the block 24 are both very flat and highly polished and the angle between the two surfaces must closely approximate a right angle. A precision measuring block 38, of precise known dimensions, is positioned with its bottom 39 resting on the surface 34 and its side 41 resting against the surface 36 in order to determine the desired predetermined extent of the arm 26 to the right for a given gear diameter. A highly polished removable disc 40 of a very accurate predetermined diameter is secured to the outer end 42 of the arm 26 by the bolt 44 so that the periphery 46 of the disc 40 extends beyond the arm 42 and the disc 40 lies on the surface 34. The periphery 46 of the disc 40 contacts the right side 43 of the block 38 thereby establishing a predetermined highly accurate distance between the surface 36 and the left-most portion of the periphery 46 of the disc 40, to very accurately fix the distance between the centers 20, 22 and the central axis 48 of the disc 40 which is substantially normal to the surface 34. The block 38 may be removed or left in place after this distance has been established as desired.

The arm 26 is locked in place after the desired distance between the center 20, 22 and the axis 48 has been set. Locking is accomplished by the locking plate 50 which has a highly polished flat lower surface 52 that engages the upper surface 34 of the arm 26 and a vertical post 54 that is movable in a vertical direction a channel 56 that is formed in the block 24. The lower end of the post 54 has a reduced diameter contact portion 58 which engages the upper surface 60 of the plate 50 to force it against the surface 34 of the arm 26, thereby locking the arm firmly in place in the passageway 28. The upper end of the post 54 has a beveled contact portion 62 which engages the lower end 64 of the locking bolt 66 which can be screwed into a threaded portion 68 at the upper end of the channel 56 by the force applied to the lever 71.

The periphery 46 of the disc 40 is engaged by the point 70 of an external contact finger 72 which is mounted to pivot about the centers 74, 76. The center 74 extends into an indentation 78 in the upper shaft 80 while the center 76 extends into an indentation 82 of the short shaft 84. The shafts 80 and 84 extend from a spherically-shaped enlargement 86. The contact finger 72 tapers in diameter as it extends to the right and at its outer end it has a generally spherically-shaped abutment member 88 which engages the pins 90, 92 of an indicator reversing mechanism 94. The reversing mechanism 94 is coupled to an indicator 96 where the pointer 98 indicates the deviation of the abutment 88 from a central "zero" location. The above described contact finger 72 and indicator 86 are conventional and are also used to measure gears that are mounted for rotation between the centers 20, 22.

The base diameter of the gear to be checked may be labeled Rb and the radius of the disc 40 that is being used may be labeled Rd. For convenience different size discs may be used for different base diameters; for example, one-half inch diameter disc may be used for gears with a base diameter between one and one-half inch to three inches. Similarly, a one inch diameter disc may be used for gears with a base diameter between three and six inches; a one and one-half inch diameter disc for gears with a base diameter between six and twelve inches, and a three inch diameter disc for gears with a base diameter between twelve and twenty-four inches.

Two angles K and B may be defined. The angle K in radians is equal to the ratio $Rd/Rb$. The secant of the angle B is equal to the distance D between the centers 20, 22 and the disc center line 48, as shown in FIG. 2, divided by Rb. If it is assumed that a zero deviation of the point of contact of the finger 70 with the periphery 46 of the disc 40 from the trace of a perfect involute curve exists at an angle of rotation, or roll, of zero degrees of the gauge, then another zero deviation will occur when the arm 26 has been rotated through an angle (K plus 0.1B) from this initial position. Another zero deviation occurs at an angular rotation of (K plus 1.6B) degrees of the arm 26 from the initial location. The point of contact of the periphery 46 of the disc 40 and the finger 70 will closely approximate an involute curve over a relatively small angle of rotation of the arm 26, on the order of 35°.

The points between the zero deviation points for the involute curve will exhibit both positive and negative variations from an ideal involute curve for a certain disc center distance (D). The maximum negative variation will occur at K minus B degrees of rotation while the maximum positive variation will occur at K plus B degrees of rotation. The magnitude of the maximum positive and negative variations are equal to each other and to the magnitude of the base radius, Rb, for one particular disc center distance (D) calculated from the equation $SEC\ B = COSK + \sqrt{K^2 + SIN^2 K}$, multiplied by the involute function of the angle B. The involute function of the angle B is equal to tangent B minus the angular value of B in radians.

Tables I and II which give examples of typical values are shown below.

TABLE I

| Rb In Inches | Rd In Inches | K In Degrees | B In Degrees | D In Inches |
|---|---|---|---|---|
| 0.75 | 0.25 | 19.100 | 7.500 | 0.75647 |
| 1.50 | 0.50 | 19.100 | 7.500 | 1.51294 |
| 3.00 | 0.75 | 14.324 | 5.630 | 3.01454 |
| 6.00 | 1.00 | 9.549 | 3.755 | 6.0129 |
| 12.00 | 1.50 | 6.162 | 2.816 | 12.01450 |

TABLE II

| K minus B Roll In Degrees (Maximum Negative Deviation In Inches) | K plus .1B Roll In Degrees (Involute Deviation In Inches) | K plus B Roll In Degrees (Maximum Positive Deviation In Inches) | K plus 1.6B Roll In Degrees (Involute Deviation In Inches) |
|---|---|---|---|
| 11.600 | 19.85 | 26.600 | 31.100 |
| (−0.000565) | (0.000000) | (±0.000565) | (0.000000) |
| 11.600 | 19.85 | 26.600 | 31.100 |
| (−0.001130) | (0.000000) | (+0.001130) | (0.000000) |
| 8.694 | 14.887 | 19.954 | 23.332 |
| (−0.000954) | (0.000000) | (+0.000954) | (0.000000) |
| 5.754 | 9.925 | 13.304 | 15.557 |
| (−0.000565) | (0.000000) | (+0.000565) | (0.000000) |
| 4.346 | 7.440 | 9.978 | 11.668 |
| (−0.000480) | (0.000000) | (+0.000480) | (0.000000) |

What is claimed is:

1. An involute checking gauge for verifying that a gear checking instrument is operational for use with a multitude of gear base diameters over a predetermined range of base diameters wherein said instrument includes a rotation means which provides rotation of an object in engagement therewith about an axis of rotation, and a sensing means; and said gauge comprises engagement means for engaging said rotation means so that said gauge is rotated by said rotation means, said engagement means including a section having a passageway therethrough and a first substantially flat surface, substantially parallel to the axis of rotation of said rotation means, an elongated arm slideably extending through said passageway and having a substantially flat second surface that makes substantially a right angle with said first surface, and a substantially cylindrically shaped disc secured to an outer end of said arm so that the longitudinal axis of said disc is substantially normal to said second surface and so that the periphery of said disc extends beyond said outer end of said arm and into contact with said sensing means and locking means for selectively locking said arm so that it does not move relative to said section when a predetermined distance between said first surface and the longitudinal axis of said disc has been established.

2. An involute checking gauge as claimed in Claim 1, wherein said rotation means of said instrument comprises a pair of spaced apart centers and said engagement means comprises a pair of shafts each of which are in contact with one of said centers, said shafts being separated by said section.

3. An involute checking gauge as claimed in claim 1, wherein said disc is removably secured to said second surface.

4. An involute checking gauge as claimed in claim 3, wherein said passageway is cylindrically shaped and has an inner surface, said arm has a pair of sides which have a cross-sectional shape such that they each form an arc of a circle of substantially the same size as said passageway and said locking means applies a force to said arm so as to force said arm into a position where said arm engages said inner surface of said passageway and thereby prevents further movement of said arm relative to said section.

5. An involute checking gauge as claimed in claim 1, wherein said passageway is cylindrically shaped and has an inner surface, said arm has a pair of sides which have a cross-sectional shape such that they each form an arc of a circle of substantially the same size as said passageway and said locking means applies a force to said arm so as to force said arm into a position where said sides engage said inner surface of said passageway and thereby prevent further movement of said arm relative to said section.

6. An involute checking gauge as claimed in claim 5, wherein said section has a channel that runs substantially normal to said passageway which is threaded at least part way therethrough and said locking means comprises a substantially flat plate in engagement with said second surface and force application means in engagement with said plate comprising a post movably positioned in said channel which contacts said flat plate and threaded means in threaded engagement with the threads in said channel which contacts said post so as to force said post against said flat plate thereby locking said arm in place relative to said section.

7. An involute checking gauge as claimed in claim 6, wherein said rotation means of said instrument comprises a pair of spaced apart centers and said engagement means comprises a pair of shafts each of which are in contact with one of said centers, and shafts being separated by said section.

8. An involute checking gauge as claimed in claim 1, wherein said section has a channel that runs substantially normal to said passageway which is threaded at least part way therethrough and said locking means comprises a substantially flat plate in engagement with said second surface and force application means in engagement with said plate commprising a post movably positioned in said channel which contacts said flat plate and threaded means in threaded engagement with the threads in said channel which contacts said post so as to force said post against said flat plate thereby locking said arm in place relative to said section.

* * * * *